J. S. JOHNSTON.
MACHINE GUN.
APPLICATION FILED NOV. 3, 1915.
1,335,839.
Patented Apr. 6, 1920.
7 SHEETS—SHEET 1.
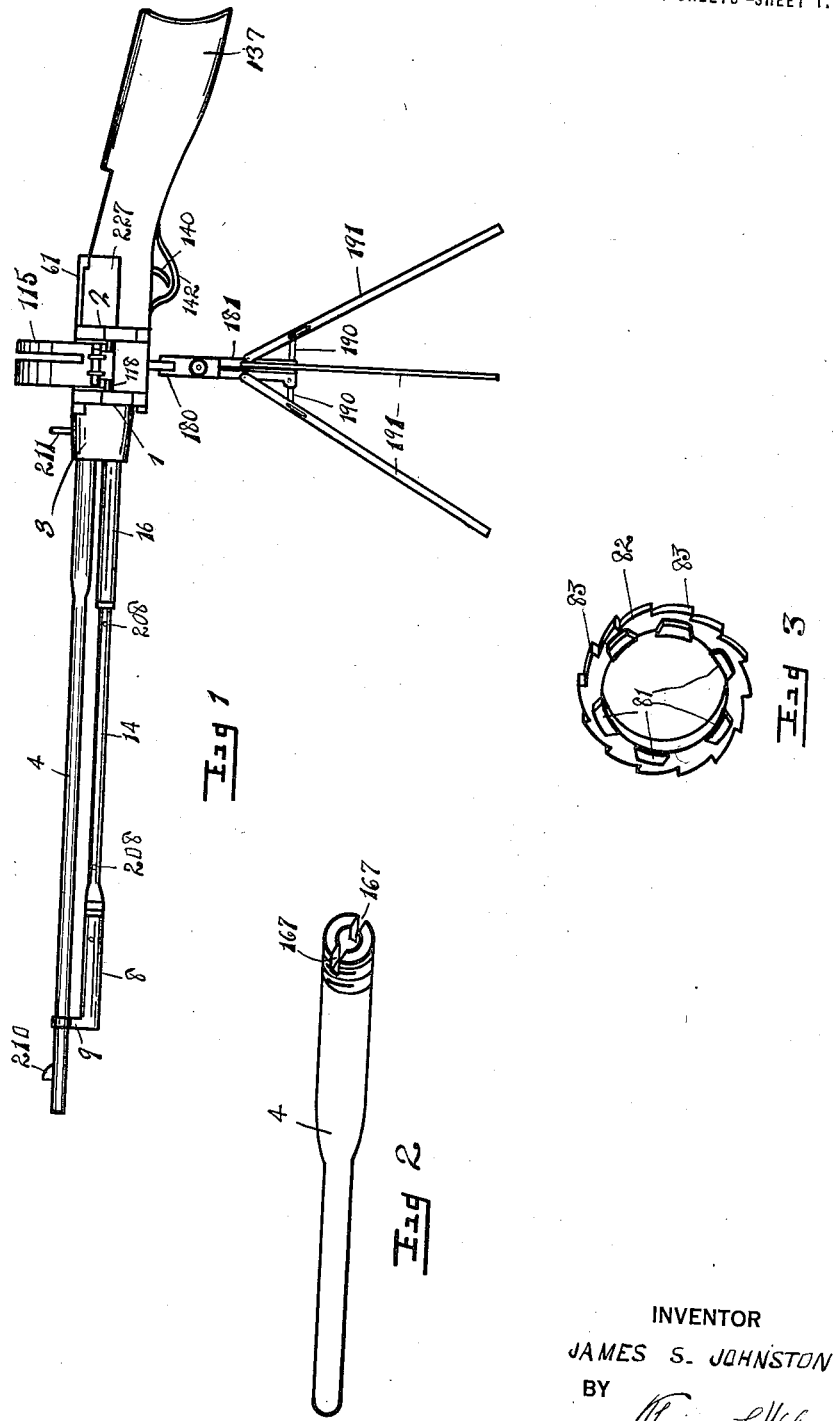
INVENTOR
JAMES S. JOHNSTON
BY
Thomas L. Wilder
ATTORNEY J. S. JOHNSTON.
MACHINE GUN.
APPLICATION FILED NOV. 3, 1915.
1,335,839.
Patented Apr. 6, 1920.
7 SHEETS—SHEET 2.
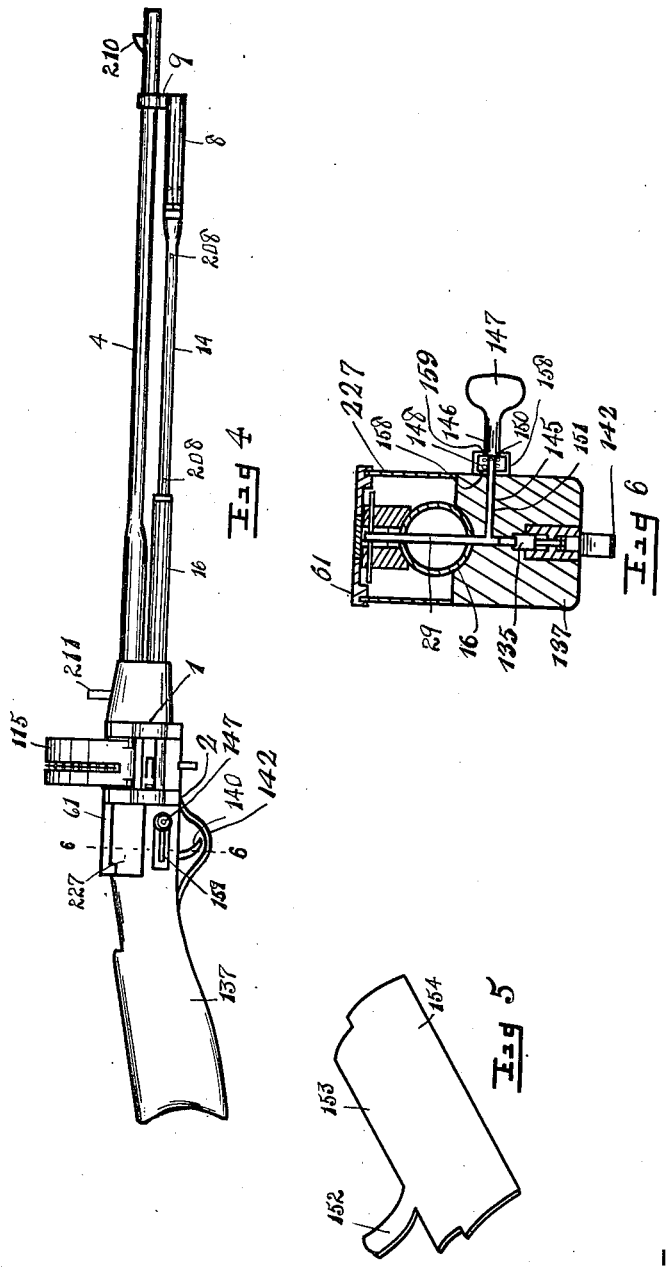
INVENTOR
JAMES S. JOHNSTON
BY
ATTORNEY

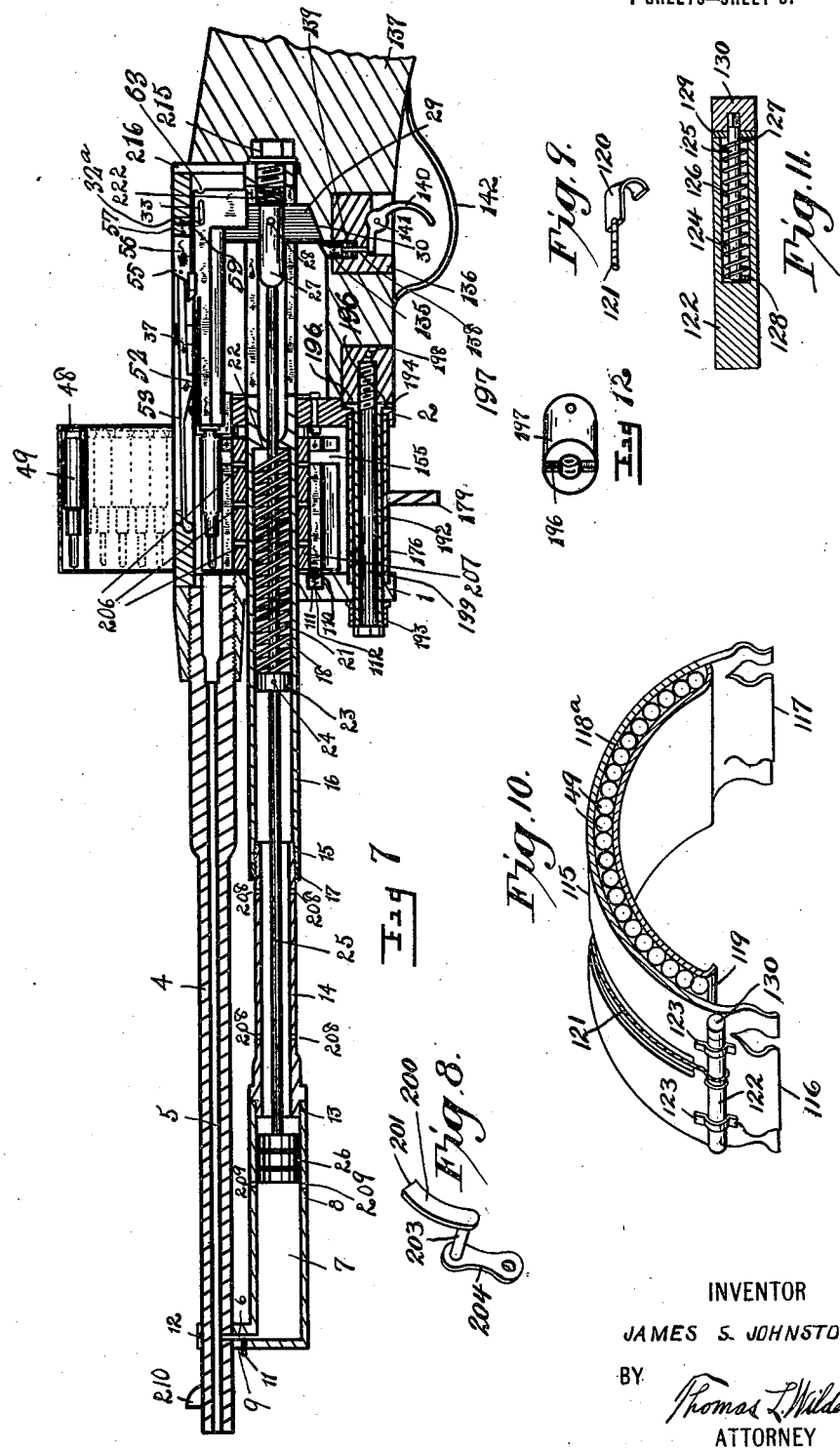

J. S. JOHNSTON.
MACHINE GUN.
APPLICATION FILED NOV. 3, 1915.
1,335,839.
Patented Apr. 6, 1920.
7 SHEETS—SHEET 4.
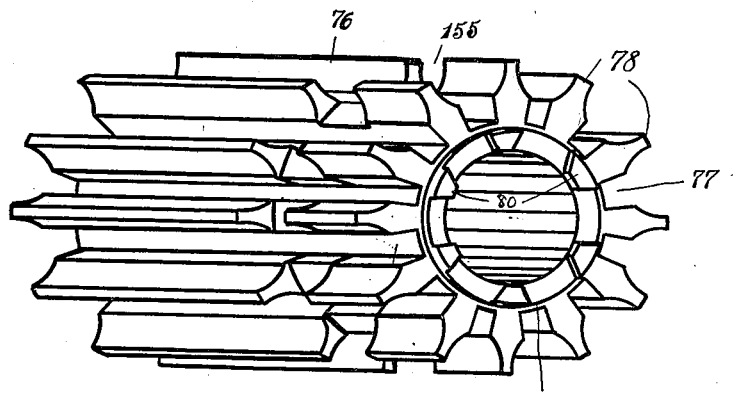
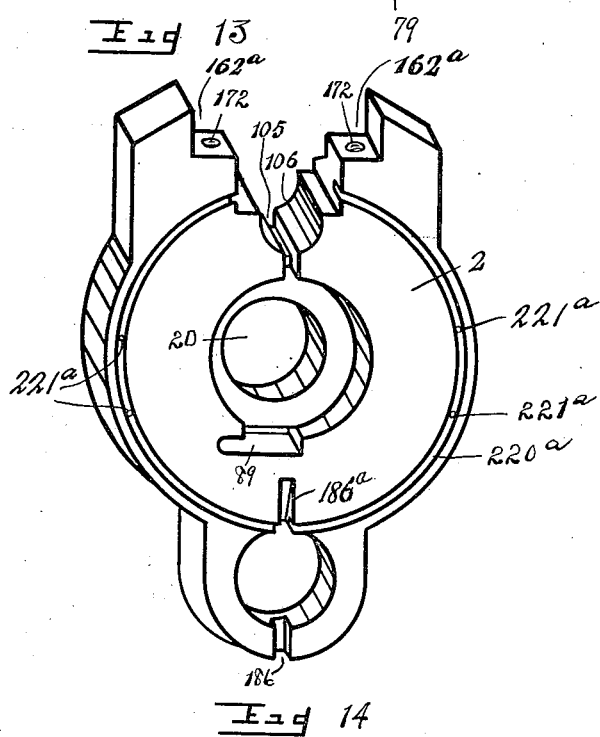
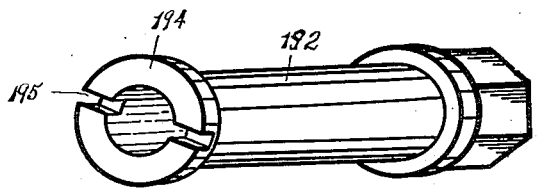
INVENTOR
JAMES S. JOHNSTON
BY
Thomas L. Wilder
ATTORNEY

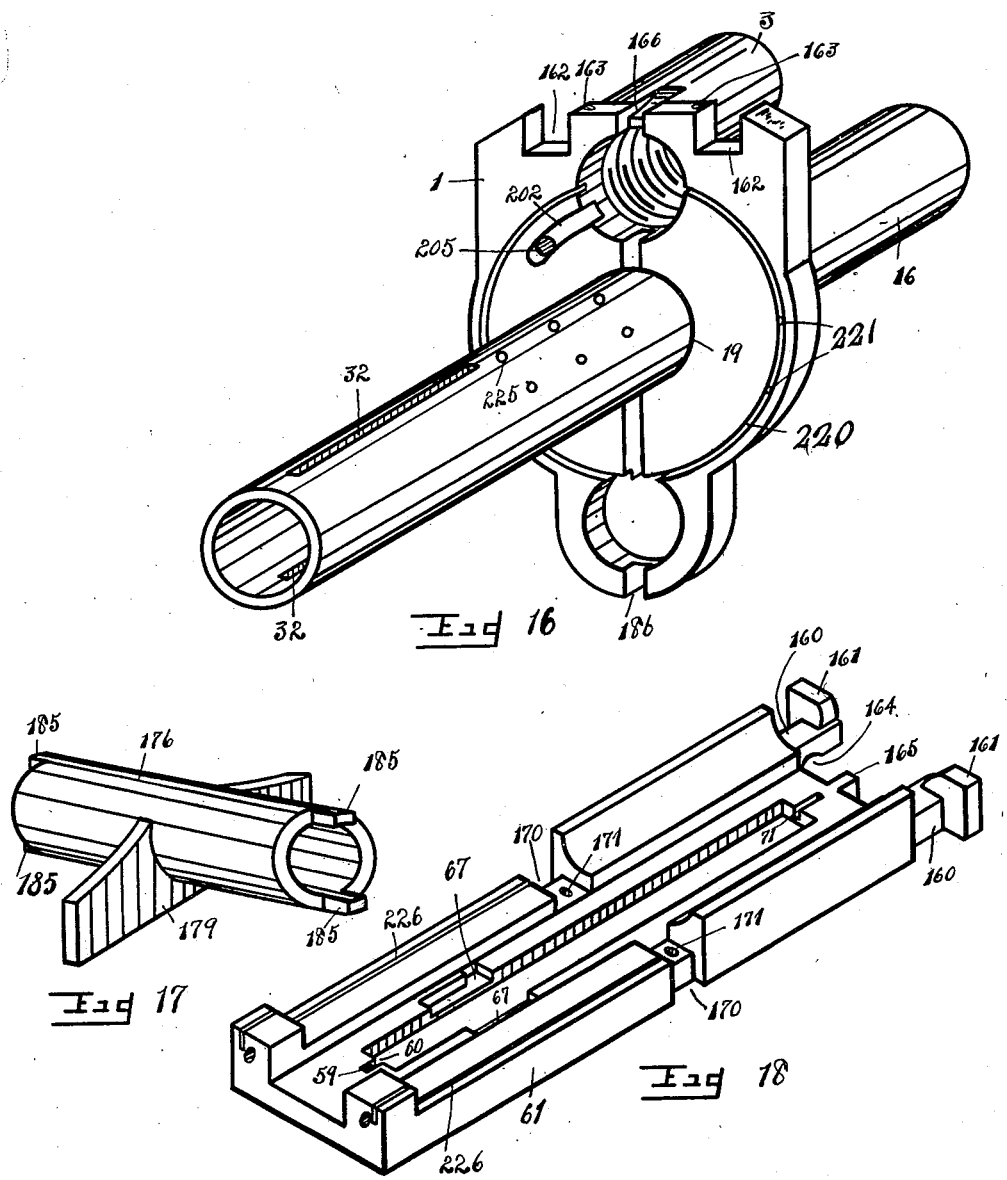

J. S. JOHNSTON.
MACHINE GUN.
APPLICATION FILED NOV. 3, 1915.
1,335,839.
Patented Apr. 6, 1920.
7 SHEETS—SHEET 6.
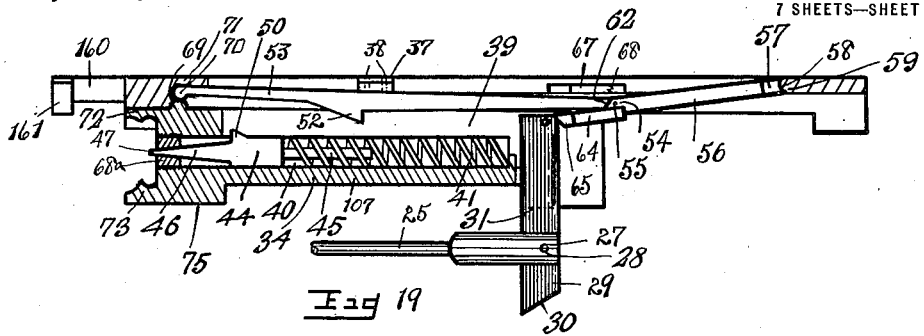
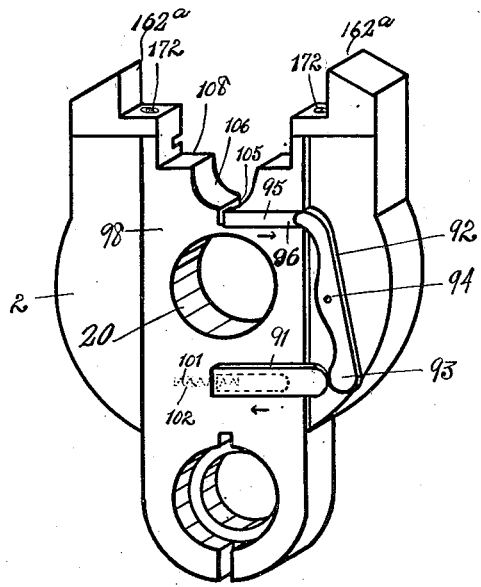
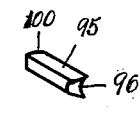
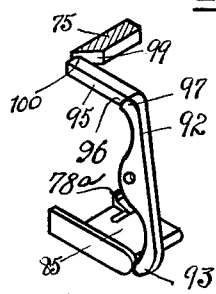
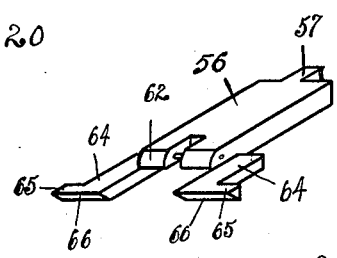
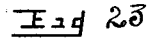
INVENTOR
JAMES S. JOHNSTON
BY
Thomas L. Wilder
ATTORNEY

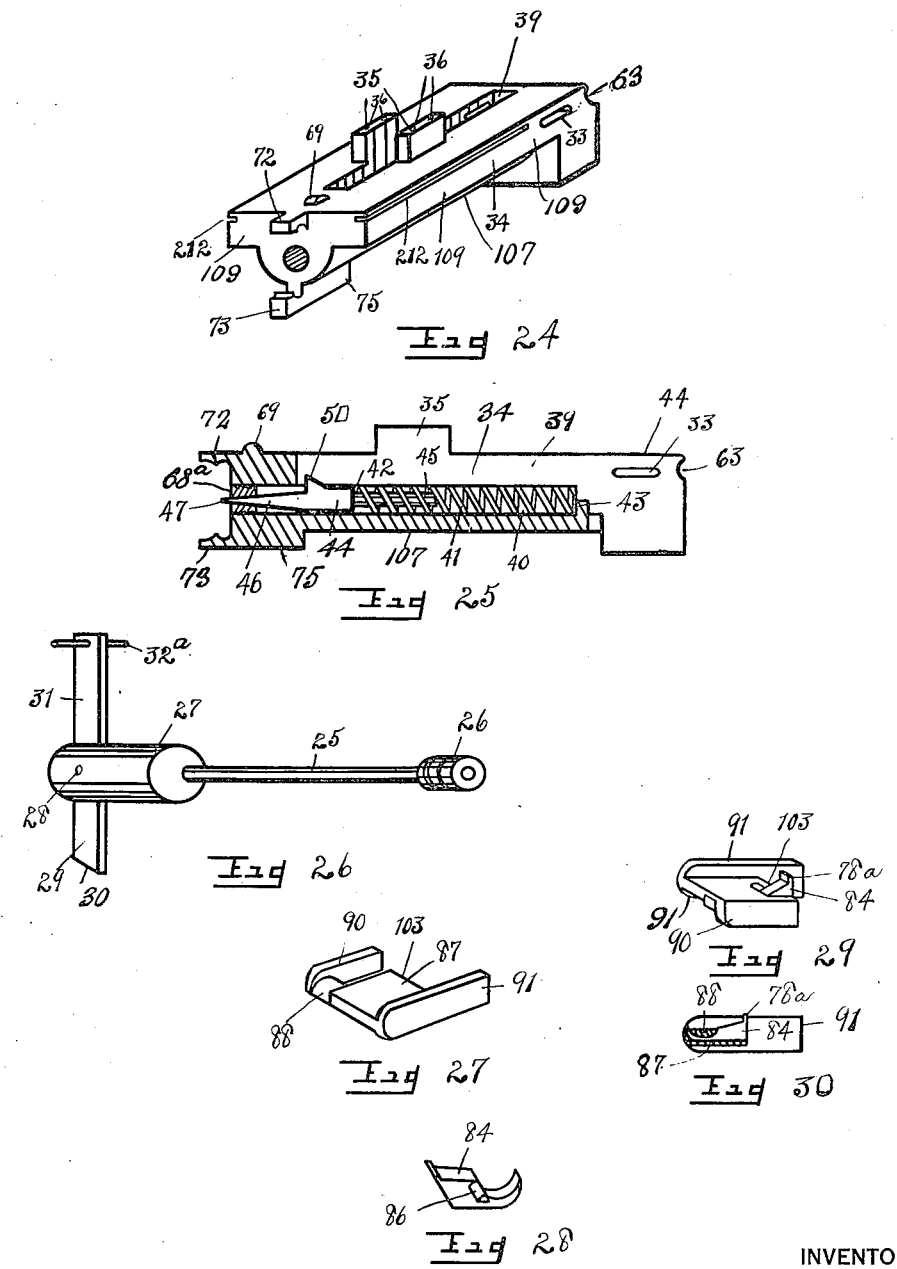

UNITED STATES PATENT OFFICE.

JAMES S. JOHNSTON, OF UTICA, NEW YORK.

MACHINE-GUN.

1,335,839.	Specification of Letters Patent.	Patented Apr. 6, 1920.

Application filed November 3, 1915. Serial No. 59,346.

*To all whom it may concern:*

Be it known that I, JAMES S. JOHNSTON, a citizen of the United States, residing at Utica, in the county of Oneida and State of New York, have invented certain new and useful Improvements in Machine-Guns, of which the following is a specification, reference being had therein to the accompanying drawing.

My invention relates to a machine gun and I declare the following to be a full, clear, concise and exact description thereof sufficient to enable any one skilled in the art to which it appertains to make and use the same, reference being had to the accompanying drawings in which like reference characters refer to like parts throughout the specification.

The object of the invention is to provide a comparatively light, efficient machine gun of simple construction that will fire rapidly without fouling or clogging.

The gun is designed to be operated automatically by the expansion of gases or manually in accordance with the desire of the user. It can be mounted upon a tripod for firing or, by reason of its lightness, held to the shoulder of the person or soldier.

Furthermore, the gun is adapted to fire continuously by the automatic actuation of its part under the influence of the expanding gases or singly at the option of the user.

Moreover, the parts of the gun are few in number and are easily assembled. This feature permits of the accessibility of the parts for cleaning purposes.

The invention will be more fully understood by referring to the drawings in which:

Figure 1 is a side elevation of the gun, showing the same mounted upon a tripod;

Fig. 2 is a detail view showing a perspective of the barrel employed;

Fig. 3 is a perspective detail view of a ratchet used;

Fig. 4 is a side elevation of the gun showing the side opposite that illustrated in Fig. 1;

Fig. 5 is an enlarged perspective view of a section of the casing, showing the ejector attached thereto;

Fig. 6 is an enlarged vertical section taken on the line 6—6 of Fig. 4;

Fig. 7 is an enlarged longitudinal vertical section, showing parts broken away;

Fig. 8 is a detail perspective view of a spring and immediate parts employed;

Fig. 9 is a detail perspective view of a hook used in connection with the clip for loading the cartridges;

Fig. 10 is an enlarged perspective view of the clip, partially in section;

Fig. 11 is a central vertical section of a roller used on the clip;

Fig. 12 is a detail perspective view of a nut employed;

Fig. 13 is an enlarged perspective view of the cartridge carrier used;

Fig. 14 is an enlarged perspective view of a disk shaped plate used;

Fig. 15 is an enlarged perspective view of a bolt used;

Fig. 16 is an enlarged perspective view of a second disk shaped plate, showing an arbor or pipe passing therethrough;

Fig. 17 is an enlarged perspective view of a sleeve and contiguous part used;

Fig. 18 is an enlarged perspective view of the top plate used;

Fig. 19 is an enlarged view of the top plate and immediate parts including the breech bolt, showing the same partially in section;

Fig. 20, is an enlarged perspective view of the rear disk shaped plate, being the side opposite to that illustrated in Fig. 14;

Fig. 21 is a detail perspective view of a link shown in connection with Fig. 20;

Fig. 22 is a detail view, showing the assembly of certain members for actuating the cartridge carrier;

Fig. 23 is a detail perspective view of the locking device employed to hold the breech bolt momentarily in forward position;

Fig. 24 is an enlarged perspective view of the breech bolt;

Fig. 25 is a central vertical section of the breech bolt illustrated in Fig. 24;

Fig. 26 is a perspective view of a piston and rod and immediate parts employed;

Fig. 27 is a perspective view of a movable plate used in connection with the actuation of the cartridge carrier;

Fig. 28 is a detail perspective view of a dog used to actuate the carrier;

Fig. 29 shows in detail the assembly of the dog illustrated in Fig. 28 and the plate of Fig. 27;

Fig. 30 is a vertical section of the plate shown in Figs. 27 and 29, illustrating the manner in which the dog of Fig. 28 is assembled.

Referring more particularly to the drawings, the machine gun embodies the two disk shaped plates —1— and 2. The plate —1— has formed integral wherewith the internally screw threaded sleeve 3 adapted for the mounting of the barrel 4, provided with the bore 5 and the outlet channel 6 leading to the chamber 7 of the gas pipe 8. The pipe 8 has a projection 9 provided for the channel 6, intercepted to a greater or less degree by the adjustable screw 11, whereby to control the amount of gases entering the chamber 7. The projection 9 is sleeved to the barrel 4 and held in position by a set screw 12. The pipe 8 is screw mounted at 13 to the pipe 14 which is likewise in turn screw mounted at 15 to the pipe 16 and held in assembled position by the lock nut 17. The pipe 14 allows for the longitudinal adjustment of the alined chambers of the pipes 8, 14 and 16, whereby to regulate the degree of pressure of the gases from the barrel 4. The pipe 16 passes through the orifice 19 in the disk —1— and the orifice 20 in the disk 2 and has an enlarged chamber at 18 for the disposition of a coiled spring 21 that bears at one end against the shoulder 22 and at the other against the collar 23 fastened by a set screw 24 to the rod 25 surrounded for a portion of its length by the coiled spring 21.

The forward end of the rod 25 is provided with a piston head 26, mounted to slide in the chamber 7 of the pipe 8. The rear or opposite end of the rod 25 is enlarged at 27 and fastened by a pin 28 to a member 29 with a beveled lower edge 30 and an upward extending part 31 holding a pin 32ª. Beyond the shoulder 22, the pipe 16 is chambered for the movement of the enlarged portion 27 of the rod 25 and is slotted at 32—32 for the passage of the member 29.

The parts of the pin 32ª situated on either side of the member 29 lie in the open elongated recesses 33—33 made in the longitudinally movable breech bolt 34. The breech bolt 34 has the shoulders 35—35 provided with threaded apertures 36 for the assembling of a plate 37 thereacross by means of the screws 38. The bolt 34 possesses also the open elongated recess 39 connected with the cylindrical recess 40 in which is disposed the coiled spring 41 of lesser elastic force than the coiled spring 21. One end of the spring 41 bears against the shoulder 43 of the bolt 34 and the other end bears against the shoulder 42 of the firing pin 44. The firing pin 44 is provided with the cylindrical arm 45 extending rearwardly into the coils of the spring 41 and with the conical portion 46 whose point 47 is adapted to strike the primer 48 of the cartridge 49. The firing pin 44 has also the tooth 50 projecting upwardly from the conical portion 46 into the elongated recess 39.

The tooth 50 is adapted to be engaged by the depending tooth 52 of the lever 53 pivoted at 54 to the pin 55 of the locking member 56. The locking member 56 has integral therewith the tongue 57 with a matrix or semicylindrical open end 58 adapted to loosely engage the counter part 59 formed at the end of a narrow passage 60 in the plate 61. The matrix 58 abutting, as it does, against the counter part 59, forms a fulcrum upon which the locking member 56 swings within a given radius, whereby its free end 62 will be permitted, at the proper moment, to drop down into engagement with the circular aperture 63 formed in the end of the breech bolt 34. Furthermore, the locking member 56 has the forwardly extending arms 64—64 developing at their ends into the laterally projecting branches 65—65 formed with the beveled front surfaces 66—66, whose lower surfaces are situated below the under surface of the locking member 56, although in a parallel plane. The arms 64 and the branches 65 are adapted to occupy the correspondingly shaped recesses 67—67 made in the plate 61, when the locking member 56 is in its horizontal position, as illustrated in Fig. 7. The free end 62 of the locking member 56 will be forced normally downward by the coiled springs 68—68, which lie in each instance, above the arms 64 adjacent the end 62 and are secured within the recesses 67 to the plate 61.

The forward end of the cylindrical recess 40 of the breech bolt 34 is threaded for the mounting of a bushing 68ª having a conical aperture for the passage of the end or point 47 of the firing pin 44. A nub 69, integral with the breech bolt 34 and situated near its forward end, provides a means over which the end 70 of the lever 53 may ride to thereby elevate, at the proper instant, the tooth 52 from engagement with the tooth 50 of the firing pin 44. A recess 71 is made in the plate 61 for the disposition of the upper forward end of the lever 53.

The breech bolt 34 is provided with the integral overhanging brackets 72 and 73. The inner or adjacent surfaces of these brackets determine a matrix for the reception of the primer portion 48 of the cartridge 49, so that the cartridges 49 can roll therein laterally and be held while the breech bolt 34 pushes them into the chamber in the barrel 4 to be there fired and then draws the shells out to be carried on to the ejector.

The lower bracket 73 extends somewhat below the body of the breech bolt 34 to serve as a guide 75 for the longitudinal traveling motion of the breech bolt 34 over the successive raceways of the cartridge carrier 76.

The carrier 76 is mounted loosely upon the pipe 16, as an arbor, between the disk shaped plates —1— and 2, and is provided with the rabbets 77 forming raceways for the passage of the guide 75, as stated above. The outer lateral portions of the members 78 forming the rabbets are rounded off on the quarter circle to furnish chambers to receive the cartridges 49.

One end of the carrier 76 is reduced in circumference at 79 and has formed integral with the end, at given intervals, the teeth 80. The interstices between the teeth 80 are filled, when the parts are assembled, with the lateral projecting teeth 81 of the ratchet 82, which has also the peripheral teeth 83. The teeth 80 of the carrier 76 and the teeth 81 of the ratchet 82 make a perfect fitting joint, when assembled, whereby the carrier 76 and the ratchet 82 will be locked and revolved together.

The carrier 76 is intermittingly rotated upon the pipe or arbor 16, as an axis, whereby to bring the cartridges 49 successively into loading position, by a spring pressed dog 84 having a tooth 78$^a$ which lies normally in mesh with the peripheral teeth 83 of the ratchet 82 and is held yieldingly in such position by a coiled spring 85 disposed beneath the arm 86 of the dog 84. The spring 85 rests or is housed in a suitable aperture provided in the plate 87. The plate 87 is recessed for the detachable reception of the dog 84, placed in said recess in such a manner that its curved under surface loosely contacts with the correspondingly curved under surface 88 of the plate 87 to thereby permit the dog 84 to rock up into the position illustrated in Figs. 22, 29 and 30, to which position it is normally forced by the spring 85. The plate 87 is adapted to slide back and forth in the recess 89 of the disk shaped plate 2. It is held from lateral displacement by the depending flange 90 on one side and the double flange 91—91 on the other. The depending flange 90 also allows for the disposition of the plate 87 within the recess 89.

The plate 87 is forced intermittingly in the direction indicated by the arrow in Fig. 20, whereby the dog 84 will engage a peripheral tooth 83 of the ratchet 82 to rotate the cartridge carrier 76 through a given arc so as to bring the next cartridge 49 into loading positon by the lever 92. The lower end 93 of the lever 92 abuts against the end of the double flange 91 of the plate 87. The lever 92 is in turn rocked on its fulcrum 94 by the slide 95 having an open semi-circular end 96 for the reception of the counterpart end 97 of the lever 92. The slide 95 is beveled to form a dovetail joint with the correspondingly shaped recess in the raised portion 98 of the disk shaped plate 2 and, furthermore, is confined to a longitudinally reciprocating sliding motion therein. The slide 95 is actuated in the direction indicated by the arrow in Fig. 20 by allowing its free end to contact with the beveled end 99 of the guide 75 attached to the breech bolt 34. The end of the slide 95, as at 100, is rounded off to make an easy approach for the beveled end 99 of the guide 75. The plate 87 is forced normally in the opposite direction, when the tooth 78$^a$ of the dog 84 will ride over the next succeeding tooth 83 of the ratchet 82 by a coiled spring 101, that is held in a cylindrical recess 102 formed in the plate 2. The coiled spring 101 bears against the edge 103 of the plate 87 for this purpose. The rounded end 100 of the slide 95 normally lies in the path or recess 105 made in the disk shaped plate 2, through which recess the guide 75 is projected when the breech bolt 34 moves rearwardly. The recess 105 of the disk shaped plate 2 connects with the semicircular recess 106 intended for the sliding reception of the like portion 107 of the breech bolt 34. Likewise, the shoulders 108—108 are intended for the sliding reception of the portions 109—109 of the breech bolt 34.

The carrier 76 is yieldingly held in position, where the cartridge 49 will aline with the chamber of the barrel 4 by a spring pressed ball 110 partially occupying a recess 111 in which the coiled spring 112 is disposed. The ball protrudes sufficiently far from its recess to lodge in a yielding manner between the sides of each successive rabbet or raceway 77 to thereby lock the said carrier 76 yieldingly in given position.

The cartridges 49 are fed to the carrier 76 by means of a detachable semicircularly shaped clip 115 provided at either end with the flexible portions 116 and 117. The portions 116 and 117 are adapted to straddle the bars 118 secured to the disk shaped plates 1 and 2. The clip 115 has a chamber 118$^a$ with an opening 119 for the reception of the cartridges 49. The cartridges 49 are drawn toward the opening 119 by a hook 120 embracing the cartridge located farthest from the opening 119. The hook 120 is fastened to a cord 121 whose opposite end is secured to a roller 122 held loosely in assembled position by the clamps 123—123 mounted upon the clip 115. The roller 122 is chambered at 124 to house a spindle 125 surrounded by a coiled spring 126 attached at one end, as at 127, to the spindle 125 and at the other, as at 128, to the roller 122. The chamber 124 is closed at the end by a plate 129 having an aperture for the projection of the spindle 125. The projecting extremity of the spindle 125 is angled and held in a similar shaped recess in the stationary block 130 rigidly mounted on the surface of the clip 115.

The member 29 is held in cocked position against the tension of the coiled spring 21 by the sear or plunger 135 slidingly mounted in a suitable recess in a casing 136 disposed within the stock 137. The sear 135 has a reduced portion at 138, which is surrounded by the sear spring 139, normally urging the sear upward into engagement with the member 29. The sear 135 is drawn down against the tension of the spring 139 by the trigger 140 to which it is pivoted. The trigger 140 is fulcrumed in the casing 136 at 141. A trigger guard 142 is secured to the stock 137 in usual manner.

The member 29 may be drawn rearwardly into cocked position against the tension of the coiled spring 21 by the plunger 145 having an enlarged portion at 146 and a handle at 147. A coiled spring 148 surrounds the reduced portion 145 and bears against the shoulder 150 at one end and the side of the casing 158 at the other, whereby to force the plunger normally outward and away from the member 29. By pushing inward, however, against the tension of the spring 148, the inner end of the plunger 145 will come into engagement with the forward edge of the member 29. Moving the plunger 145 then to the rear, along the slot 151 formed in the stock 137 and the slot 159 formed in the casing 158, will draw the member 29 back into cocked position.

The cartridges 49 are ejected from the carrier 76 on the side opposite to that on which they enter by the tappet or arm 152 formed integral with the inwardly bent portion 153 of a section 154 of the casing that surrounds the cartridge carrier 76. The free end of the arm 152 lies well within the groove 155 made in the carrier 76, and extends below the shells of the cartridges 49 and thus insures their exit from the gun.

The disk shaped plates —1— and 2 are held in given relation by the top plate 61 provided with the extensions 160 having the heads 161. The extensions 160 are adapted to be disposed within the recesses 162 made in the upper portion of the disk shaped plate —1— and to be confined therein by screws or bolts mounted in the threaded orifices 163 in the plate —1—. The heads of the screws engage the surfaces of the extensions 160, as at 164. The top plate 61 has a projecting member 165 adapted to lie, when assembled, within the recess 166 of the plate —1— and the recess 167 of the barrel 4, whereby to hold the said parts in perfect alinement. The recesses 170—170 are formed adjacent the middle of the top plate 61 and are adapted to lie within the correspondingly shaped recesses 108—108 of the disk shaped plate 2. Screws or bolts are passed through the threaded apertures 171—171 into the like apertures 172—172 to hold the parts together at that location.

The sleeve 176 has integral therewith a transversely disposed piece 179 adapted to fit into the pocket 180 of the tripod 181 provided with the auxiliary braces 190 and the legs 191.

A hollow bolt 192 is housed within the sleeve 176 which is threaded at one end for the reception of a nut 193 and headed at the other, as at 194. The head 194 is grooved at 195 for the disposition of the lug 196 integral with the nut 197 held within a recess in the stock 137 by a pin 198. Furthermore, a headed bolt 199 is disposed within the hollow bolt 192 and is screw threaded at one end to the nut 197. The groove 195 and the lug 196 serve to aline the stock 137 with the other parts of the gun.

In order to insure the proper disposition of the cartridges 49 in the carrier 76, as they drop therein from the clip 115, there is provided a spring 200 having a free end 201 adapted to abut successively against each rabbet or raceway 77 of the carrier 76, whereby to push the cartridges 49 to the rear and in alinement with the apertures in the brackets 72 and 73 of the breech bolt 34. The flat spring 200 is assembled to the recess 202 of the disk shaped plate —1—. A bolt 203 fixed to the lower end of the spring 200 holds the spring 200 in position. On the side opposite the spring 200, the bolt 203 is secured to a member 204, which is fastened to the plate —1— by a screw. An aperture 205 is formed in the plate —1— for the bolt 203.

Apertures 206 are made in the hub 207 of the carrier 76 to admit air for cooling purposes. Likewise, the apertures 208 in the pipe 14. The apertures 209 in the pipe 8 permit the escape of the gases of explosion for the forward movement of the piston head 26 under the pressure of the spring 21.

The usual forward sight 210 and rear sight 211 are employed.

The rear end of the pipe 16 is closed by the threaded bolt 215. A member 216 having a circular aperture for the projection of the pipe 16, connects the rear end of the top plate 61 with said pipe.

The disk shaped plates 1 and 2 are each provided with the annular grooves 220 and 220ª respectively for the disposition of the edges of the casing 154. The lugs 221 form stops against which the contiguous edges of the sectional casing 154 abut. The spaces between the lugs are left open for the admission and exit of the cartridges and shells respectively.

A buffer spring 222 forms a yielding stop for the rearward movement of the rod 25.

The projections 185 of the sleeve 176 fit into correspondingly shaped apertures 186 and 186ª respectively in the plates 1 and 2, whereby to hold the parts in alinement.

The grooves 226 in the top plate 61 are formed for the disposition of the upper edges of the casing plates 227—227.

The barrel 4 has the usual interior rifling, comprising four turns, as generally used, to give the bullet a rotary movement on its longitudinal axis, as the same leaves the barrel.

The operation of the gun is effected by first disposing a clip 115 filled with cartridges 49 in proper position upon the gun as illustrated in Figs. 1, 4, and 7. The member 29 is then drawn back into cocked position, if it is not already there, by the manipulation of the handle 147 of the plunger 145. A rearward pull upon the trigger 140 will disengage the sear 135 from the member 29 and hence allow the rod 25 and its connected part the member 29 to move forward under the tension of the spring 21. Immediately the member 29 is actuated forward a short distance, the pin 32$^a$ of the member 29 will engage the forward ends of the recesses 33 in the breech bolt 34 and cause the same to move therewith in unison. The lateral grooves 212 in the breech bolt 34, permit this forward movement of the same past the adjacent edges of the sectional casing 154. As the breech bolt 34 goes forward, it will push a cartridge 49 into the chamber in the barrel 4. Just before the breech bolt 34 reaches its forward position, the tooth 50 of the firing pin 44 will engage the depending tooth 52 of the lever 53 and hold the firing pin 44 stationary, while the other parts of the breech bolt 34 continue on in a forward direction, whereby to tighten the tension of the spring 41. Immediately the breech bolt 34 arrives in its full forward position, the end 62 of the locking member 56 will drop down under the influence of the coiled springs 68 into the aperture 63 formed in the end of the breech bolt 34, whereby to hold the breech bolt 34 momentarily in its forward position during the firing of the cartridge 49. Simultaneously with the dropping of the end 62 of the locking member 56 into the aperture 63 of the bolt 34, the forward end 70 of the lever 53 will ride up upon the nub 69 and thereby elevate the tooth 52 of the lever 53 from its engagement with the tooth 50 of the firing pin 44. The firing pin 44 will then dart forward under the influence of the coiled spring 41 to permit its point 47 to strike and explode the primer 48 of the cartridge 49, so as to project the bullet through the barrel 4.

The gases of explosion will thereafter expand through the outlet 6 into the chamber 7 of the gas pipe 8 and force the piston head 26 rearwardly. Simultaneously, the member 29 will move to the rear, at first independently of the breech bolt 34. The pin 32$^a$ will ride under the beveled forward ends 66 of the arms 64 and thereby disengage the end 62 of the locking member 56 from the aperture 63 of the breech bolt 34. As the pin 32$^a$ continues its rearward movement, it will reach, in time, the opposite ends of the recesses 33 in the breech bolt 34 and thenceforth compel the bolt 34 to move back in unison.

Just before the breech bolt 34 reaches its ultimate rearward location, the beveled end 99 of the guide 75 attached to the bolt 34, will contact with and push in a lateral direction, the slide 95. This movement of the slide 95 will rock the lever 92 and consequently cause the lower end 93 thereof to urge the plate 87 in a certain direction that will be instrumental in causing the tooth 78$^a$ of the dog 84 to revolve the cartridge carrier 76 through a given arc or sufficiently far to bring the next cartridge 49 into loading position. The primer 48 of the cartridge 49 will roll laterally into the jaws or recesses furnished by the overhanging brackets 72 and 73. There is sufficient distance between the end 79 of the carrier 76 and the adjacent surface of the disk shaped plate 2, to allow for the actuation of the carrier 76 after the guide 75 has passed beyond the rabbet or raceway 77.

The empty shell, which is extracted from the chamber in the barrel 4 is brought back to loading position and then carried on toward the ejector 152, where the same is rolled out of the gun.

The firing of the gun may be by single shot or be continued automatically until all the cartridges 49 in the clip 115 are expended, by holding the finger on the trigger.

Obviously, it will be necessary to work the gun by hand until the first cartridge 49 arrives into loading position.

Having thus described my invention what I claim as new and desire to secure by Letters Patent is:

1. In a machine gun, a revoluble cartridge carrier for bringing a cartridge into loading position, a ratchet removably attached to said carrier, a spring pressed tooth having a transverse movement and adapted to engage said ratchet, whereby to turn said carrier, means for compelling the expanding gases of explosion to control the movements of said tooth and means for locking said cartridge carrier in given position, whereby to aid in loading the cartridges.

2. In a machine gun, a barrel, a gas chamber in communication with said barrel, a cartridge carrier, a piston and rod in said gas chamber a breech bolt containing a spring pressed firing pin and adapted to be actuated by said piston, a lever having a depending tooth for controlling said firing pin, automatic means for actuating said lever to release said firing pin, and a spring pressed ball for locking said cartridge carrier in given position, whereby to aid in loading the cartridges.

3. In a machine gun, a barrel, a gas chamber in communication with said barrel, a piston in said gas chamber, a breech bolt actuated by said piston and carrying a spring actuated firing pin, a movable member for locking the breech bolt in firing position, arms and branches on said movable member, an actuator adapted to engage said arms and branches, whereby to release said movable member from locking position, a lever having a tooth for holding the firing pin against the tension of the spring, and a nub on said breech bolt for rocking said lever, whereby to release the firing pin to explode the cartridge.

4. In a machine gun, a barrel, a gas chamber in communication with said barrel, a piston in said gas chamber, a breech bolt actuated by said piston and carrying a spring pressed firing pin, a movable member for locking the breech bolt in firing position, arms and branches on said member, an actuator adapted to engage said arms and branches, whereby to release said movable member from locking position, a lever having a tooth for holding the firing pin against the tension of the spring in the breech bolt, a nub on said breech bolt for actuating said lever, whereby to release the firing pin to explode the cartridge, a cartridge carrier, and automatic means for revolving the cartridge carrier, whereby to bring the cartridges into loading position.

5. In a machine gun, a barrel, a gas chamber in communication with said barrel, a piston in said gas chamber, a breech bolt actuated by said piston, and carrying a spring pressed firing pin, a movable member for locking the breech bolt in firing position, arms and branches on said member, an actuator adapted to engage said arms and branches, whereby to release said movable member from locking position, a lever having a tooth for holding the firing pin against the tension of its spring, a nub on said breech bolt for actuating said lever, whereby to release the firing pin to explode the cartridge, a cartridge carrier, and a ratchet and tooth for revolving said cartridge carrier.

6. In a machine gun, a barrel, a revoluble cartridge carrier, a breech bolt carrying a spring pressed firing pin, a lever having a depending tooth for controlling the movements of said firing pin, overhanging jaws on said breech bolt for clenching the primer portion of a cartridge, automatic means for actuating said breech bolt, whereby to load and fire the gun, and a spring pressed ball for holding the carrier in given position, while the cartridges are being loaded into the barrel.

7. In a machine gun, a barrel, a gas chamber in communication with said barrel, a breech bolt carrying a spring actuated firing pin, a lever having a tooth for holding the firing pin against the tension of the spring, a nub on said breech bolt for elevating said lever, whereby to release the firing pin to explode the cartridge, a cartridge carrier, a ratchet and tooth for actuating said cartridge carrier, whereby to bring the cartridges into loading position, and a slide and lever for transferring the motion of the breech bolt to the tooth to revolve the cartridge carrier.

8. In a machine gun, a barrel, disk shaped plates, a sleeve having projections, and recesses in said plates for the reception of the projections on the sleeve, whereby to hold the parts of the gun in alinement.

9. In a machine gun, a barrel, a gas chamber in communication with said barrel, a breech bolt carrying a spring actuated firing pin, a lever having a tooth for holding the firing pin against the tension of the spring, a nub on said breech bolt for elevating said lever, whereby to release the firing pin, a cartridge carrier, a spring pressed tooth having a transverse movement adapted to turn said carrier, and automatic means for actuating said tooth, whereby to bring the cartridges into loading position.

10. In a machine gun, a barrel, a gas chamber communicating with said barrel, a revoluble cartridge carrier, a breech bolt carrying a firing pin, and having a guide member, a slide adapted to engage with said guide, a spring pressed tooth actuated intermediately by said guide, whereby to revolve said carrier, automatic gas means for actuating said breech bolt, whereby to load and fire the gun, a member adapted to engage said breech bolt, whereby to hold it in firing position, and means for elevating one end of said last named member, whereby to release said breech bolt.

11. In a machine gun, a barrel, a gas chamber communicating with said barrel, a revoluble cartridge carrier, a breech bolt carrying a firing pin, automatic gas means for actuating said breech bolt, whereby to load and fire the gun, brackets on said breech bolt forming jaws for the extraction of the cartridges from the barrel chamber, and a spring for alining the cartridges in said carrier, whereby the brackets on said breech bolt will receive the same.

In testimony whereof I have affixed my signature in the presence of two witnesses.

JAMES S. JOHNSTON.

Witnesses:
CHARLES A. POWELL,
T. L. WILDER.